J. BURKE.
ELECTRIC MOTOR.
APPLICATION FILED JAN. 20, 1905.

909,057. Patented Jan. 5, 1909.
2 SHEETS—SHEET 1.

J. BURKE.
ELECTRIC MOTOR.
APPLICATION FILED JAN. 20, 1905.

909,057.

Patented Jan. 5, 1909.

2 SHEETS—SHEET 2.

Witnesses
Chas. D. King.
Geo. A. Hoffman.

James Burke  Inventor
By his Attorney
C. W. Edwards.

UNITED STATES PATENT OFFICE.

JAMES BURKE, OF ERIE, PENNSYLVANIA, ASSIGNOR TO BURKE ELECTRIC COMPANY, A CORPORATION OF PENNSYLVANIA.

ELECTRIC MOTOR.

No. 909,057.    Specification of Letters Patent.    Patented Jan. 5, 1909.

Application filed January 20, 1905. Serial No. 241,914.

*To all whom it may concern:*

Be it known that I, JAMES BURKE, a citizen of the United States, residing at Erie, in the county of Erie and State of Pennsylvania, have invented certain new and useful Improvements in Electric Motors, of which the following is a full, clear, and exact specification.

This invention relates to electric motors, and its object is to provide a motor adapted to be arranged within a circular housing occupying a minimum of space and having maximum power.

A further object is to provide means whereby a plurality of motor armatures may be arranged to drive a common shaft and to operate with uniform power, producing minimum heating effects, requiring a minimum magnetizing current, and being capable of convenient operation at different voltages.

The invention will be more fully described with reference to the form thereof shown in the accompanying drawings, in which—

Figure 1:
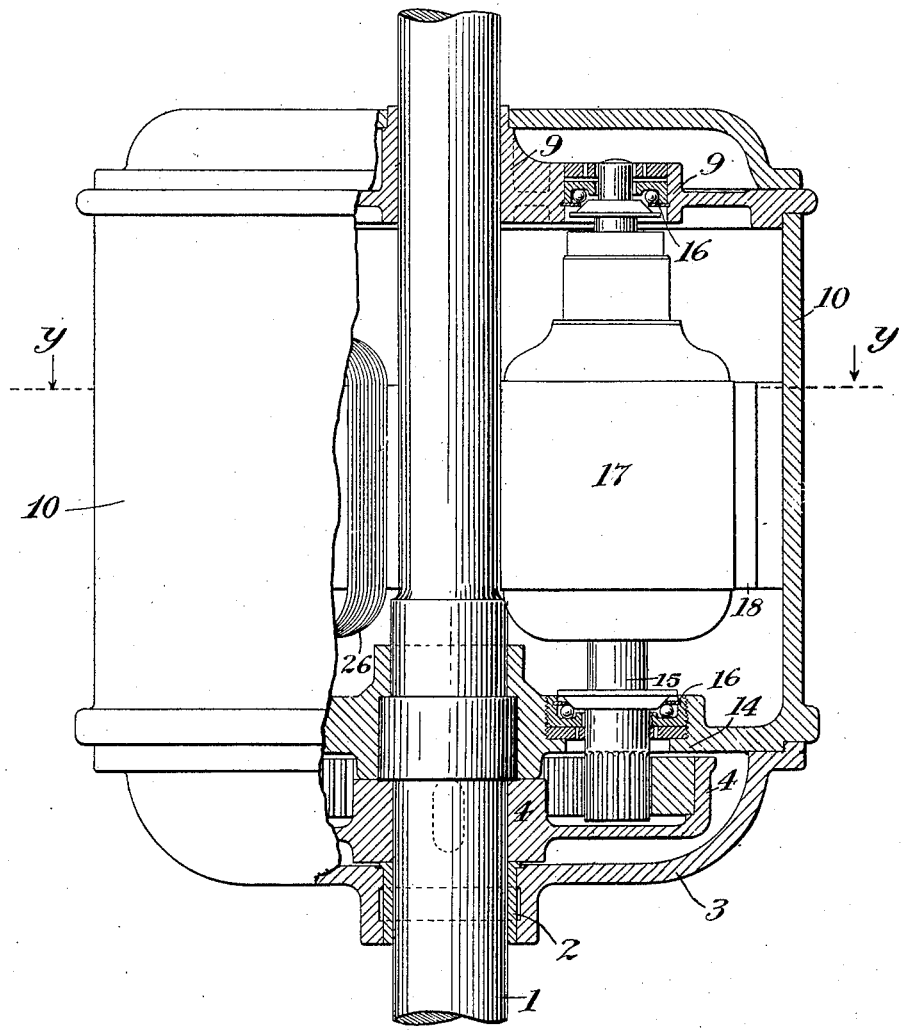
Figure 2:
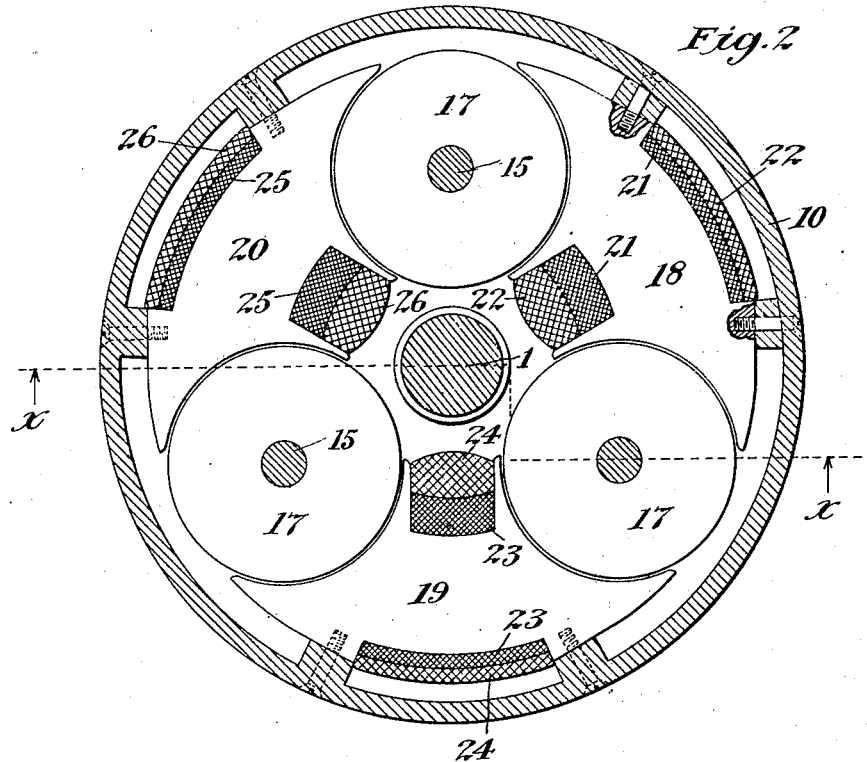
Figure 3:
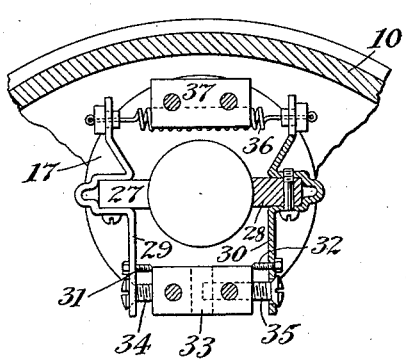
Figure 4:
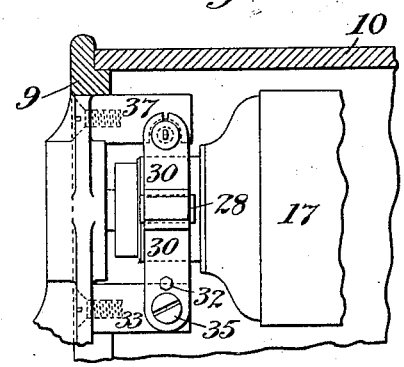

Figure 1 is an elevation, partly in section, of a motor embodying my invention, the section being taken along the line $x$—$x$ of Fig. 2; Fig. 2 is a section along the line $y$—$y$ of Fig. 1; and Figs. 3 and 4 are detail end and plan views of the commutator and brush holder.

In the drawings, 1 represents the shaft to be driven by the motor, supported in a suitable bearing 2 in the end housing 3 and bearing 5 in the end support 9, and is keyed to the internal gear plate 4.

10 is a suitable housing, preferably circular in form, surrounding shaft 1 and adapted to contain the motor. Preferably this housing is made of non-magnetic material, such as aluminum, in order to prevent magnetism from straying from the inclosed magnetic system. The end supports 9 and 14 are suitably attached to the housing and are provided with bearings 16, 16, 16, for the shafts 15 of the motor armatures 17 which are concentrically arranged around the axial line of the shaft 1. The number of armatures employed may be varied to suit individual conditions; in the present instance I have shown three. The manner of gearing the several armature shafts to the shaft 1 is not a part of my invention, as any suitable gearing between the shafts may be employed in connection with my motor. The gearing between shafts 15, internal gear 4 and shaft 1 herein illustrated is the invention of another but is here shown because it is especially suitable for my purposes.

The field magnet system for the armatures comprises a suitable number of pole pieces 18, 19, 20, which may be either solid or laminated, arranged between the several armatures to form one magnetic circuit common to all of the armatures. Thus, as shown in the drawings, the pole pieces and armatures are arranged alternately in succession, whereby the magnetic flux passes successively through each of the armatures and field poles. This insures uniformity of all of the magnetic fields in which the armatures are located, and therefore that all of the armatures shall work equally. The arrangement also reduces the length of the magnetic path to a minimum, and thus reduces the current required for magnetizing the fields, and also the quantity of metal required for a given field magnet system, and consequently the weight of the motor. The field poles may be fitted directly against the housing 10, or if preferred separated therefrom, as shown in the drawings, to provide ventilating space. The field coils of the motor may be of any suitable character. I prefer, however, to provide a compound winding, and consequently provide each pole piece with a series and a shunt coil, the shunt coils being represented, for example, by 21, 23 and 25 in the drawings, and the series coils by 22, 24 and 26. The exciting coils are wound in inner and outer recessed portions of the field poles. The outer recesses are made comparatively long and shallow and the inner ones comparatively short and deep. This gives a very compact construction. The construction as a whole forms a substantially uniform cylindrical outer surface. It will be noted that for three armatures there are only three composite windings, that is, for each armature there is only one composite field winding; also this composite field winding per armature may comprise turns forming a shunt or series field coil, or may comprise a combination of both, and the composite winding may be formed of a united group of turns or coils.

The brush-holder shown in Figs. 3 and 4 comprises the usual collecting brushes 27, 28 held in clips 29, 30, which are respectively fulcrumed by set screws 31, 32, against the support 33, and prevented from outward movement by adjustable screws 34, 35. The opposite ends of clips 29, 30 are drawn toward each other by spring 36, which is guided by a groove in support 37. Supports 33 and 37 are mounted upon the end support 9. The leads of the supply circuit are connected to clips 29 and 30. The tension upon the brushes may be adjusted either by adjusting spring 36, or by adjusting screws 31, 32. This construction requires but little fitting of parts, and enables all of the necessary brush rigging to be carried upon the support or end head 9.

The brush holder construction is omitted from Fig. 1 of the drawings in order to make the figure clearer and more readily understood.

The construction above described may be modified, or arranged differently, without departing from the spirit of my invention, and I therefore desire it to be understood that I do not herein limit myself to the precise construction or arrangement shown.

Having thus described my invention, I declare that what I claim as new and desire to secure by Letters Patent, is,—

1. The combination of a driven shaft, a plurality of armatures annularly disposed around the axial line of said shaft and geared thereto, field cores alternated with said armatures, each of said cores having a shallow and circumferentially expanded recess in its outer portion and a deep contracted recess in its inner portion, and field coils wound in said recessed portions.

2. The combination of a driven shaft, a plurality of armatures annularly disposed around the axial line of said shaft and geared thereto, field cores alternated with said armatures, each of said cores having a shallow and circumferentially expanded recess in its outer portion and a deep contracted recess in its inner portion, field coils wound in said recessed portions, and a non-magnetic housing inclosing said armatures and field magnets.

3. The combination with a driven shaft, a plurality of armatures annularly disposed around the axial line of said shaft and geared thereto, field cores alternated with said armatures, each of said cores having a comparatively shallow recess in its outer portion and a comparatively deep recess in its inner portion, field coils wound in said recessed portions, the whole forming a compact and cylindrical motor, a housing encircling said armatures and magnets and for supporting said magnets, end heads for supporting said armatures, brushes for said armatures, and means for supporting all of said brushes from one of said heads.

In testimony whereof I affix my signature, in presence of two witnesses.

JAMES BURKE.

Witnesses:
CLYDE J. INGRAM,
GEO. H. WINKLER, Jr.